Oct. 20, 1953 R. W. LOCKHART 2,656,536
OSCILLOGRAPHIC PLOTTING SYSTEM
Filed April 17, 1951 5 Sheets-Sheet 1
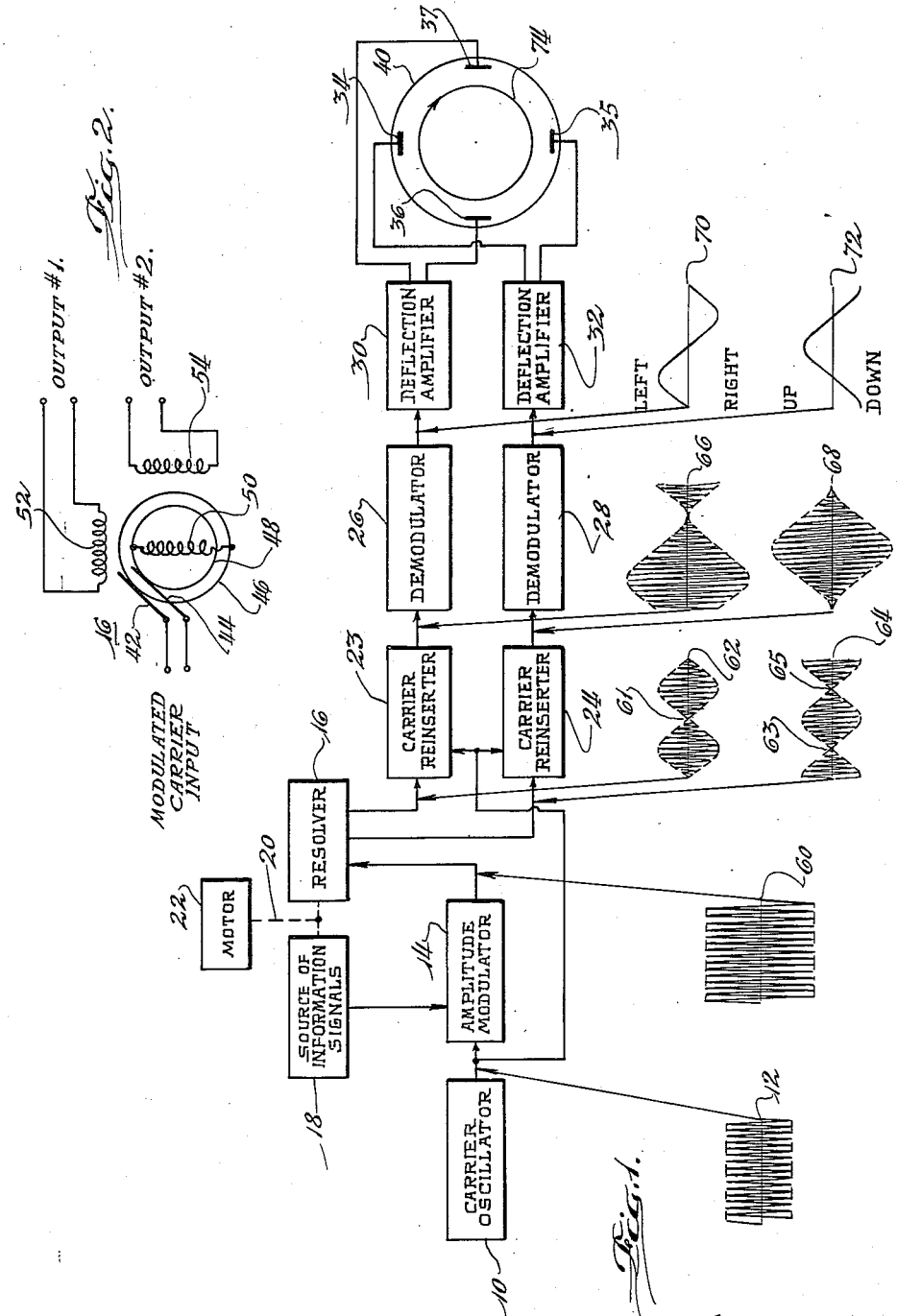
Inventor:
Robert W. Lockhart
By Hinkle, Horton, Ahlberg & Wupper
Attorneys Oct. 20, 1953
R. W. LOCKHART
2,656,536
OSCILLOGRAPHIC PLOTTING SYSTEM
Filed April 17, 1951
5 Sheets-Sheet 2
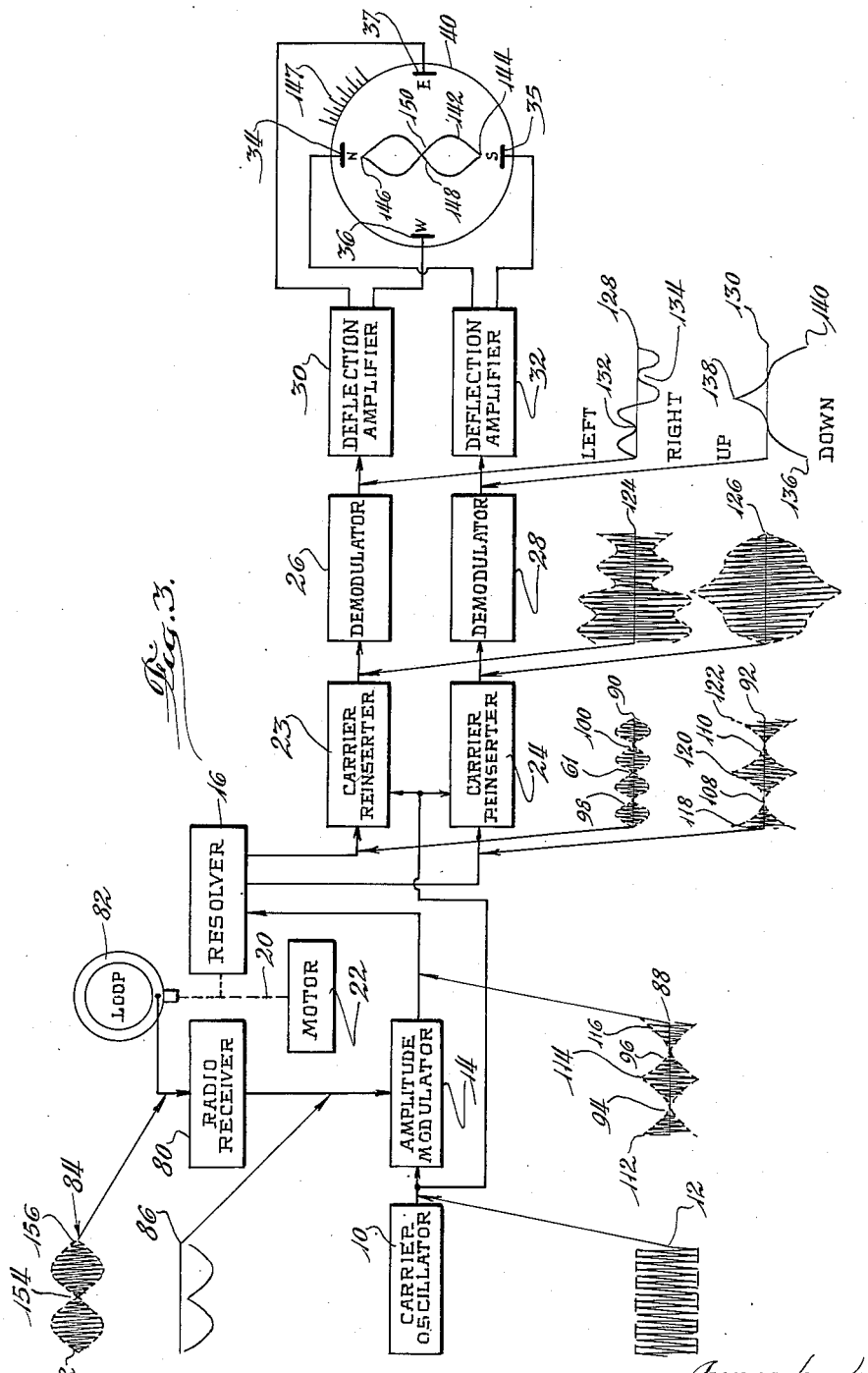

Oct. 20, 1953    R. W. LOCKHART    2,656,536
OSCILLOGRAPHIC PLOTTING SYSTEM
Filed April 17, 1951    5 Sheets-Sheet 3
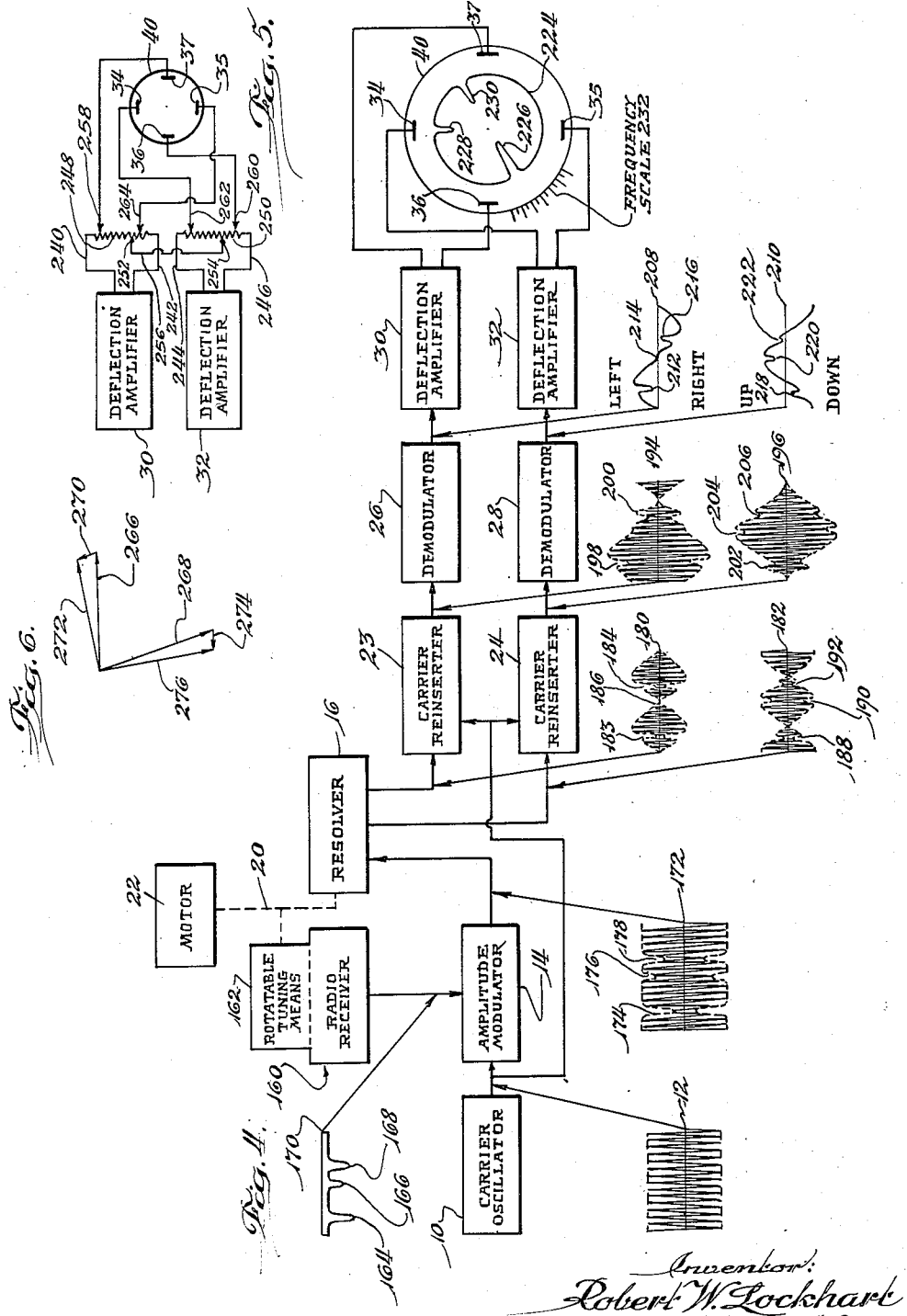

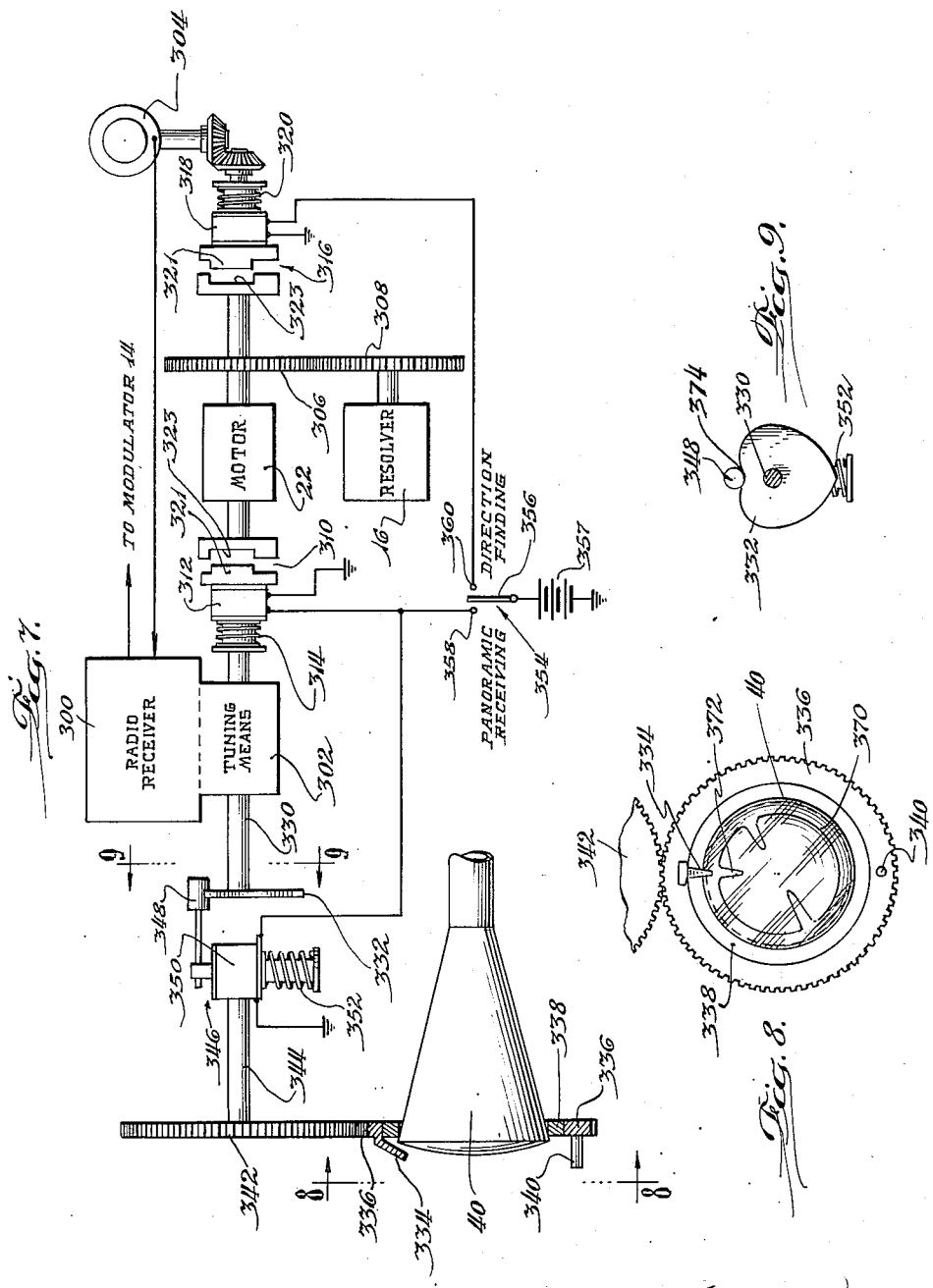

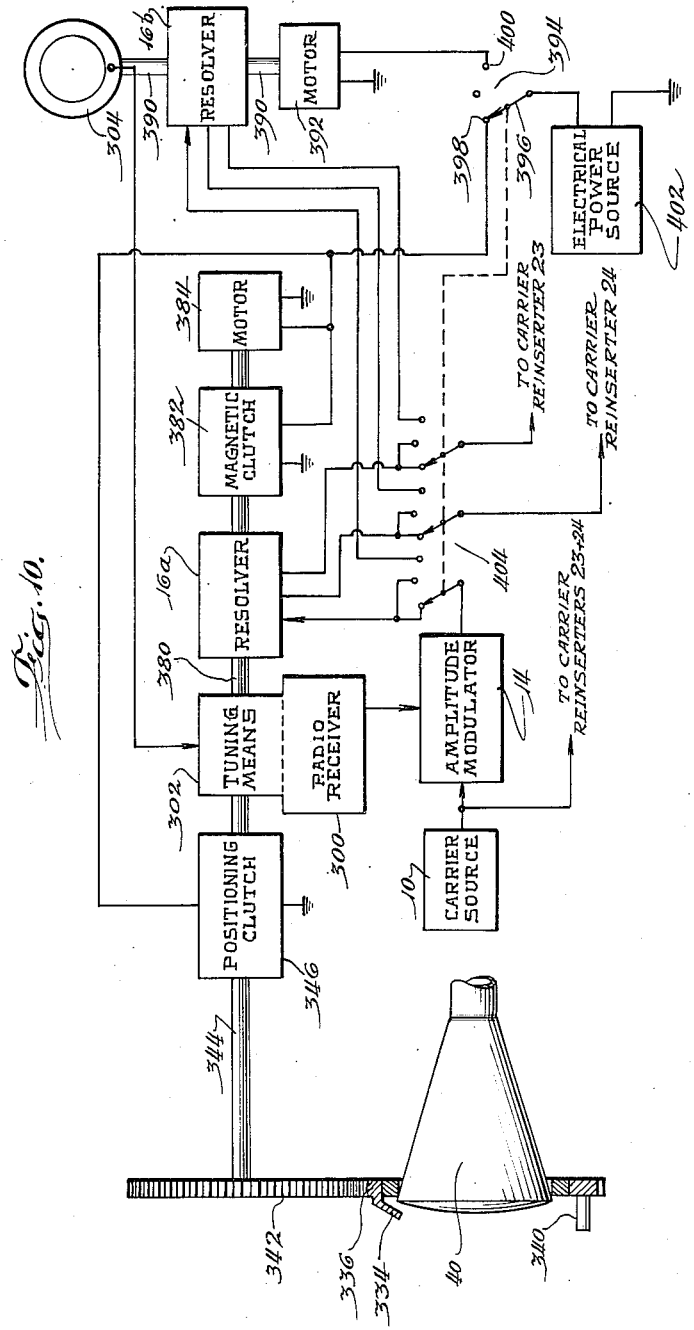

Patented Oct. 20, 1953

2,656,536

UNITED STATES PATENT OFFICE 2,656,536

OSCILLOGRAPHIC PLOTTING SYSTEM

Robert W. Lockhart, Chicago, Ill., assignor to Stewart-Warner Corporation, Chicago, Ill., a corporation of Virginia Application April 17, 1951, Serial No. 221,429

14 Claims. (Cl. 343—118)

This invention relates to devices for providing continuous oscillographic plots of a dependent variable as a function of an independent variable. For example, the dependent variable may be the electrical output of a radio receiver, and the independent variable may be the orientation of a direction finding loop which supplies radio signals to the receiver. The invention is also applicable to panoramic radio reception, in which case the dependent variable is the output of a radio receiver and the independent variable is the position of a tuning control forming a part of the receiver.

An object of the invention is to provide an improved oscillographic polar plotting arrangement.

A further object is to provide an improved instantaneous polar plotting arrangement providing a high order of accuracy in the plotting of the independent variable. Related to direction finding, this object contemplates a high order of accuracy in the plotting of the orientation of the revolving loop antenna.

A further object is to provide an oscillographic polar plotting arrangement which is particularly adapted for providing remote indications.

A further object is to provide an oscillographic polar plotting system which utilizes a high frequency current to carry information with regard to the dependent and the independent variables.

A further object is to provide an oscillographic polar plotting system which incorporates means to correct for inaccuracies in the angular configuration of the deflecting system of a cathode ray oscillograph tube forming a part of the plotting system.

A further object is to provide an oscillographic polar plotting arrangement incorporating a rotatable device for giving information with respect to an independent variable such as orientation, together with means to correct for any slight inaccuracies in the construction of the device.

A further object is to provide an improved oscillographic direction finding system or the like in which the length of cables extending from a remote loop antenna is not critical.

A further object is to provide an improved oscillographic direction finding system or the like in which the speed of rotation of the loop antenna may vary considerably.

Further objects, advantages, and features of the invention will become apparent from the following description of illustrative embodiments of the invention. In the course of the description reference will be made to the drawings, in which:

Fig. 1 is a block diagram illustrating a polar plotting arrangement constructed in accordance with the invention;

Fig. 2 is a diagrammatic illustration of a resolver which may form a part of the system of Fig. 1;

Fig. 3 is a block diagram of a direction finding system constructed in accordance with the invention;

Fig. 4 is a block diagram of a panoramic radio receiver constructed in accordance with the invention;

Fig. 5 illustrates a modified arrangement to correct for slight inaccuracies in the construction of the resolver and the oscillograph tube;

Fig. 6 is a vector diagram illustrating the operation of the arrangement of Fig. 5;

Fig. 7 illustrates a combination direction finding and panoramic receiver constructed in accordance with the invention;

Fig. 8 is an elevational view taken as indicated by the line 8—8 in Fig. 7;

Fig. 9 is a sectional view taken as indicated by the line 9—9 in Fig. 7; and

Fig. 10 illustrates a modified direction finding and panoramic receiving system.

The system of Fig. 1 includes a carrier oscillator 10 which produces a high frequency sine wave output as indicated by an oscillogram 12. The output of the carrier oscillator 10 is transmitted by an amplitude modulator 14 to a resolver 16. The output of the amplitude modulator 14 is modulated in accordance with the output of a source of information signals 18, the output of the source 18 being applied to the amplitude modulator. The resolver and the source of information signals are connected to a motor 22 by driving means 20.

The resolver 16 provides two output signals which are fed to a pair of carrier reinserters 23 and 24. Signals from the carrier oscillator 10 are also applied to the carrier reinserters.

The outputs of the respective carrier reinserters 23 and 24 are demodulated by individual demodulators 26 and 28. The outputs of the demodulators 26 and 28 are applied by deflection amplifiers 30 and 32 to horizontal deflecting plates 36 and 37 and vertical deflecting plates 34 and 35, respectively, of a cathode ray oscillograph tube 40.

One advantageous construction of the resolver 16 is shown in Fig. 2. The modulated carrier input is applied by brushes 42 and 44 and slip rings 46 and 48 to a rotatable primary coil 50 which may be rotated by the driving means 20. First and second outputs are derived by means of stationary secondary coils 52 and 54 oriented at right angles to each other.

It will be convenient to describe the operation of the system of Figs. 1 and 2 by considering a special case in which, at the moment, the source of information signals 18 is not producing any signals. In this case the output of the amplitude modulator is a carrier frequency signal having a constant peak amplitude as indicated by an oscillogram 60. Output No. 1 of the resolver 16 is represented by an oscillogram 62, and output No. 2 is represented by an oscillogram 64. The first output produces the oscillogram 62 because the coupling between the rotating primary coil 50 and the stationary secondary coil 52 varies in accordance with the absolute value of the sine of the positional angle of the primary coil 50. The coupling between the rotatable primary coil 50 and the stationary coil 54 varies in accordance with the absolute value of the cosine of the positional angle of the coil 50. In the position of the coil 50 shown, the coupling between the coil 50 and the secondary 52 is zero, while the coupling between the primary 50 and the secondary 54 is at a maximum.

The voltage in each of the secondaries 52 and 54 reverses in polarity each time the voltage passes through a null. The oscillogram 62 has a null 61. The portion of the oscillogram to the left of the null represents a voltage having one polarity, and the portion to the right of the null represents a voltage having the opposite polarity. The portion of the oscillogram 64 between nulls 63 and 65 represents a wave having one polarity, and the remaining portions represent a wave having the opposite polarity.

The oscillograms 62 and 64 represent the equivalent of the side bands of amplitude modulated waves without the carriers of the waves. The carriers are reintroduced by the carrier reinserters 23 and 24 to produce outputs having oscillograms 66 and 68.

It should be noticed in the oscillogram 66 that the carrier wave and the first output of the resolver, represented by the oscillogram 62, are additively phased for the first half of the oscillogram 66 and subtractively phased for the second half. The carrier wave and the second output, represented by the oscillogram 64, are subtractively phased for the first and last quarters of the oscillogram 68, and additively phased for the central half portion. The oscillograms 66 and 68 represent amplitude modulated waves which are demodulated by the demodulators 26 and 28 to produce outputs having oscillograms 70 and 72. The outputs of the demodulators 26 and 28 are sine waves which are 90 electrical degrees out of phase with each other. The phase displacement of the outputs of the demodulators results from the physical displacement of the secondary windings 52 and 54.

The outputs of the demodulators 26 and 28 are amplified by the deflection amplifiers 30 and 32, and are impressed upon the horizontal plates 36 and 37 and the vertical plates 34 and 35, respectively, of the cathode ray oscillograph tube 40. The two voltages deflect the electron beam of the oscillograph tube to produce a circular trace or pattern 74. The instantaneous position of the electron beam as it traces the pattern 74 corresponds to the instantaneous angular position of the rotatable coil 50 of the resolver 16. Consequently, the position of the electron beam is an accurate indication of the phasing or position of the cyclical driving means 20 which drives the source of information signals 18.

In the course of its cyclical operation by the driving means 20, the source of information signals 18 usually produces signals at some definite points in its operational cycle. These signals produce amplitude variations in the outputs of the amplitude modulator 14 and the resolver 16. The resulting variations in the outputs of the demodulators 26 and 28 produce radial displacements of the pattern produced by the cathode ray oscillograph tube, at points corresponding to the positions of the source of information signals when the signals are produced. Thus the angular position of the electron beam in the cathode ray tube 40 corresponds to an independent variable which in this case is the phasing or position of the driving means 20. The radial position of the electron beam corresponds to a dependent variable, which in this case is the amplitude of the signals produced by the source of information signals 18. The electron beam traces a continuous polar plot of the dependent variable as a function of the independent variable on the fluorescent screen of the cathode ray tube 40.

The system of Fig. 3 is very similar to the system of Figs. 1 and 2, and corresponding components in the two systems have been given the same reference characters.

In the arrangement of Fig. 3 the source of information signals takes the form of a radio receiver 80 having a rotatable loop antenna 82. The loop 82 is driven from the motor 22 by the driving means 20.

As the loop 82 rotates, it produces an output having an oscillogram 84. The exact nature of the oscillogram depends upon the direction from which the radio signals are received. The receiver 80 produces an output having an oscillogram 86. The output is applied to the amplitude modulator 14. The modulator provides an output which is modulated to correspond with the output of the receiver, as indicated by an oscillogram 88. When this output wave is applied to the resolver, the latter produces outputs having oscillograms 90 and 92. These oscillograms should be compared with the oscillograms 62 and 64 of Fig. 1. The valleys 94 and 96 in the oscillogram 88 produce the valleys 98 and 100 in the oscillogram 90. A null 61 is present in both oscillograms 62 and 90. The nulls 63 and 65 in the oscillogram 64 are broadened by the valleys 94 and 96 in the oscillogram 88 to produce broad nulls 108 and 110 in the oscillogram 92. Sharp peaks 112, 114, and 116 in the envelope of the oscillogram 88 produce corresponding peaks 118, 120, and 122 in the envelope of the oscillogram 92.

The carrier reinserters 23 and 24 add carrier components to the outputs of the resolver and thereby produce outputs having oscillograms 124 and 126. When they are demodulated by the demodulators 26 and 28, these waves produce oscillograms 128 and 130. The valleys 94 and 96 in the envelope of the oscillogram 88 produce valleys 132 and 134 in the oscillogram 128. The peaks 112, 114, and 116 in the envelope of the oscillogram 88 produce peaks 136, 138, and 140 in the oscillogram 130. When the waves represented by the oscillograms 128 and 130 are impressed upon the horizontal and vertical deflecting plates respectively of the cathode ray oscillograph tube 40, the electron beam of the tube traces a pattern 142. The pattern 142 has a pair of diametrically opposite outwardly pointing peaks 144 and 146. The peak 144 is produced by the peaks 136 and 140 in the oscillogram 130, and the peak 146 is produced by the peak 138. The pattern 142 has radial nulls 148 and 150 which are produced by the valleys 132 and 134 in the oscillogram 128.

The sharp peaks 112, 114 and 116 in the output oscillogram 88 of the modulator 14 correspond with nulls 152, 154 and 156 in the signal from the loop antenna 82. Thus the radial peaks 144 and 146 in the pattern 142 traced by the electron beam in the cathode ray tube 40 correspond to the nulls in the signal from the loop antenna. The angular position of the peaks 144 and 146 is indicative of the direction from which radio signals are being received. The tube 40 may be provided with an azimuthal scale as indicated in fragmentary fashion at 147.

The embodiment of Fig. 4 is quite similar to the embodiment of Figs. 1 and 3, and corresponding components have been given the same reference characters in the two figures.

In the system of Fig. 4, the source of information signals takes the form of a radio receiver 160 having rotatable tuning means 162 which is operated by the driving means 20. The output of the radio receiver 160 is applied to the amplitude modulator 14. The motor 22 tunes the receiver 160 from one end of its tuning range to the other. After a quick return the tuning operation is repeated. Stations, received as the frequency band of the receiver is traversed, produce output signals in the form of pulses 164, 166 and 168 as indicated in the oscillogram 170. As indicated in an oscillogram 172, the pulses are manifested in the output of the amplitude modulator in the form of valleys 174, 176 and 178, in the envelope of the output oscillogram 172.

Oscillograms 180 and 182 represent the two output signals from the resolver 16. The envelope of the oscillogram 180 has valleys 183 and 184 which correspond with the pulses 164 and 168. The pulse 166 produces a broadened null 186 in the envelope of the oscillogram 180. The envelope of the oscillogram 182 has valleys 188, 190 and 192 which are produced by the pulses 164, 166 and 168.

After the carrier is reinserted by the reinserters 23 and 24, output signals having oscillograms 194 and 196 are produced. The envelope of the oscillogram 194 has a valley 198 which corresponds with the pulse 164, and a peak 200 which corresponds with the pulse 168. The envelope of the oscillogram 196 has a peak 202 which corresponds with the pulse 164, a valley 204 which corresponds with the pulse 166, and a valley 206 which corresponds with the pulse 168.

The output signals of the demodulators 26 and 28 have oscillograms 208 and 210. The pulses 164, 166 and 168 appear in the oscillogram 208 as a valley 212, a broadened null 214, and a valley 216, respectively. The pulses appear in the oscillogram 210 in the form of valleys 218 and 220, and a valley 222.

When the signals represented by the oscillograms 208 and 210 are applied to the deflecting plates of the cathode ray oscillograph 40 by the deflection amplifiers 30 and 32, a pattern 224 is traced by the electron beam of the cathode ray tube. The pattern 224 has inwardly directed radial spikes 226, 228 and 230, which correspond with the pulses 164, 166 and 168. The angular position of the spikes is indicative of the frequency of the signals which produce the pulses in the output of the radio receiver. The fluorescent screen of the cathode ray tube 140 may be provided with a circular frequency scale, as indicated in fragmentary fashion at 232. The length of the spikes in the pattern 224 indicates the relative strength of the stations which are being received.

In all of the embodiments of Figs. 1 through 4, the angular position of the electron beam 40 in the cathode ray oscillograph tube 40 corresponds closely with the position of the driving means 20, provided that the resolver 16 and the cathode ray tube 40 are accurately constructed. The deflection amplifiers 30 and 32 preferably should be direct current amplifiers in order to obtain accurate indications of the position of the driving means 20 when the latter is stationary, or moving at extremely low speeds.

In practice, errors are likely to exist in the perpendicularity of the secondary windings 52 and 54 in the resolver 16, and in the perpendicularity of the vertical deflecting plates 34 and 35 and the horizontal deflecting plates 36 and 37. Fig. 5 illustrates a modified arrangement to compensate for any errors which may exist. In Fig. 5 the deflection amplifier 30 is shown as having output conductors 240 and 242, and the deflection amplifier 32 has output conductors 244 and 246. A voltage dividing resistor 248 is connected across the output conductors 240 and 242, and a voltage dividing resistor 250 is connected across the output conductors 244 and 246. The voltage dividing resistors have respective fixed taps 252 and 254 which are connected together by a conductor 256.

The horizontal deflecting plate 37 is connected to a slider 258 which contacts the voltage divider or potentiometer 248 adjacent its end which is connected to the conductor 240. The other horizontal deflecting plate 36 is connected to a slider 260 which contacts the voltage divider 250 adjacent the tap 254.

The vertical deflecting plate 34 is connected to a slider 262 which contacts the voltage divider 250 adjacent its end which is connected to the output conductor 244. The other vertical deflecting plate 35 is connected to a slider 264 which contacts the voltage divider 248 adjacent the tap 252.

The taps 260 and 264 may be adjusted to compensate for any error in perpendicularity of the resolver secondary coils 52 and 54 or the deflecting plates of the oscillograph tube 40. Adjusting the sliders 260 and 264 affects the relative phasing of the voltages applied to the vertical and horizontal deflecting plates. By means of the arrangement of Fig. 5, a portion of the horizontal deflecting voltage from the amplifier 30 may be applied to the vertical deflecting plates along with the vertical deflecting voltage, and a portion of the vertical deflecting voltage from the amplifier 32 may be applied to the horizontal deflecting plates along with the horizontal deflecting voltage. The sliders 258 and 262 provide for adjustment of amplitude of the horizontal and vertical deflecting voltages, respectively.

The vector diagram of Fig. 6 illustrates the operation of the phasing network of Fig. 5. A vector 266 represents the voltage from the slider 258 to the tap 252. A vector 268 represents the voltage from the slider 262 to the tap 254. Because of an error in the perpendicularity of the resolver coils 52 and 54, these voltage vectors are not exactly 90 degrees apart. The angle between them is somewhat less than 90 degrees. A vector 270, representing the voltage from the tap 254 to the slider 260, is added to the vector 266. The vector 270 is displaced 180 degrees from the vector 268. The resultant voltage between the horizontal deflecting plates 37 and 36 is represented by a vector 272.

A vector 274 representing the voltage between the tap 252 and the slider 264 is added to the vector 268. The vector 274 is displaced 180 degrees from the vector 266. The resultant voltage between the vertical deflecting plates 34 and 35 is represented by a vector 276. The vectors 272 and 276 are 90 degrees apart, indicating that the voltages across the horizontal and vertical deflecting plates are in quadrature.

Fig. 6 illustrates a case in which the phasing network of Fig. 5 is adjusted to increase the angle between the voltages on the horizontal and vertical deflecting plates. It will be apparent that the angle between the voltages applied to the horizontal and vertical deflecting plates can be decreased by adjusting the sliders 260 and 264 to reverse the polarity of the vectors 270 and 274. The sliders 260 and 264 may also be adjusted to apply voltages to the horizontal and vertical deflecting plates which are not exactly in quadrature, in order to compensate for any error in the perpendicularity of the deflecting plates. A circular pattern may be produced on the fluorescent screen of the cathode ray tube 40 by properly adjusting the sliders 260 and 264 and also the sliders 262 and 258.

The relative phasing of the horizontal and vertical deflecting voltages may be adjusted by shifting only one of the sliders 260 and 264. In that case the other slider may be aligned with the fixed tap 252 and 254 on its potentiometer 248 or 250.

Fig. 7 is a diagrammatic illustration of a combination panoramic and direction finding receiver system. Except as indicated in the following description, the system of Figs. 7 to 9 may be the same as the arrangement of Figs. 1 and 3.

In the system of Figs. 7 to 9, the source of information signals takes the form of a radio receiver 300 having rotatable tuning means 302 and a rotatable loop antenna 304. The resolver 16 is driven by the motor 22 through gears 306 and 308. A magnetic clutch 310 is provided to connect the rotatable tuning means 302 with the motor 22. The magnetic clutch 310 has a solenoid 312 for engaging the clutch and a spring 314 for disengaging the clutch when the solenoid is not energized.

A magnetic clutch 316 is provided for connecting the loop antenna 304 with the motor 22. The clutch 316 has a solenoid 318 for engaging the clutch and a spring 320 for disengaging the clutch when the solenoid is not energized. When the clutches 310 and 316 are engaged they provide positive driving connections from the motor to the tuning means 302 and the loop antenna 304. When they are engaged the clutches 310 and 316 maintain the tuning means 302 and the loop antenna 304 in definite orientational relationships with the resolver 16. For example, the clutches 310 and 316 may include off-center torque transmitting tongues 321, together with complementary grooves 323.

The tuning means 302 has a shaft 330 which carries a cardioidal or heart-shaped locating cam 332. The shape of the cam 332 is best shown in Fig. 9.

The cathode ray oscillograph 40 is provided with a pointer 334 which is mounted on a ring gear 336 carried in concentric relationship with the tube 40 by a stationary bearing ring 338. The ring gear 336 is provided with a handle 340 for moving the pointer 334 manually.

The ring gear 336 meshes with a gear 342. The gear ratio between the gears 336 and 342 is unity. The gear 342 is connected by a shaft 344 with a magnetically operated positioning clutch 346 which includes the cam 332. The clutch may include a follower roller 348 which is movable into engagement with the cardioidal cam 332. A solenoid 350 is provided to disengage the follower 348 from the cam. A spring 352 urges the follower 348 against the cam 332 when the solenoid 350 is not energized.

A changeover switch 354 is provided for changing from panoramic receiving to direction finding. The switch has a movable member 356 which is connected to one terminal of a potential source 357. The member 356 is movable between a fixed contact 358 which is connected to one terminal of each of the clutch solenoids 312 and 350, and a fixed contact 360 which is connected to one terminal of the clutch solenoid 318. The other terminals of the solenoids 312, 318 and 350, and of the potential source 357, are connected together, by respective ground connections for example. The switch member 356 also has an intermediate position in which all of the solenoids are disconnected.

As indicated, the output of the radio receiver 300 is connected to the amplitude modulator 14. The arrangement of the carrier oscillator 10, the modulator 14, the resolver 16, the carrier inserters 23 and 24, the demodulators 26 and 28, the deflection amplifiers 30 and 32, and the cathode ray oscillograph tube 40 may be the same as in the system of Figs. 1 and 3.

In the operation of the system of Fig. 7, the movable member 356 of the switch 354 is moved into its panoramic receiving position in engagement with the contact 358. The clutch solenoid 312 is thus energized from the potential source 357 and the clutch 310 is engaged. The positioning clutch 346 is disengaged by energization of the solenoid 350. The clutch 316 remains disengaged. The motor 22 drives the tuning means 302 and the resolver 16 to produce a pattern 370 on the oscillograph 40. When the changeover switch 354 is in its panoramic receiving position the apparatus of Fig. 7 operates in the manner described in connection with the panoramic receiver of Fig. 4. The pattern 370 as illustrated in Fig. 8 is quite similar to the pattern 224 as illustrated in Fig. 4.

The pointer 334 is then lined up manually with a radial spike 372 in the pattern 370. The presence of the spike 372 indicates that a station is operating at a frequency corresponding to the angular position of the spike on the screen of the oscillograph 40.

The movable member 356 of the switch 354 is then moved into its direction finding position in engagement with the contact 360. This disengages the clutch 310 and engages the clutch 316. The motor 22 is thereby disconnected from the tuning means and connected with the loop antenna 304. In the direction finding position of the switch 354 the positioning clutch 346 is engaged by the spring 352 so that the follower roller 348 moves into engagement with the cardioidal cam 342. The roller 348 rotates the cam 332 until the roller is centered in a cusp or depression 374 in the cam. The gear 336 and the bearing 338 may be fitted tightly to provide friction for holding the follower assembly 346 stationary. When the roller 348 is centered in the cusp 374 the tuning means is adjusted to the frequency corresponding to the position of the pointer 334. Consequently the receiver 300 is tuned to the station which produced the radial spike 372.

The motor 22 rotates the loop antenna 304 to produce a direction finding pattern on the oscillograph similar to the pattern 142 in Fig. 3. Thus both the frequency and the direction of a station are readily and quickly ascertainable.

When the switch 354 is in its direction finding position, the tuning means 302 may be shifted by moving the pointer 334. The rotation of the pointer rotates the cam follower 348 and thereby produces corresponding rotation of the cardioidal cam 332.

Thus when the switch 354 is set for panoramic receiving, the frequencies of a number of stations may be recorded. The direction of each of the stations may be determined by shifting the switch 354 to its direction finding position and moving the pointer 334 successively to the positions corresponding to the respective frequencies of the stations.

The system of Fig. 10 is somewhat similar to the system of Figs. 7 to 9, and corresponding components have been given the same reference characters in the various figures. The arrangement of the pointer 334, the ring gear 336, the bearing 338, the handle 340, the gear 342, and the shaft 344 is the same as in Fig. 7. The positioning clutch 346 connects the shaft 344 with the tuning means 302 of the receiver 300.

A common shaft 380 connects the tuning means 302 with a resolver 16a and a normally disengaged magnetic clutch 382. The tuning means 302 and the resolver 16a may be driven through the clutch 382 by means of a motor 384.

A common shaft 390 connects the loop 304 with a resolver 16b and a motor 392.

A switch 394 is provided, including a movable member 396 and a pair of fixed contacts 398 and 400. The contact 398 is connected to one of the terminals of the positioning clutch 346, the magnetic clutch 382 and the motor 384. The other contact 400 is connected to one terminal of the loop motor 392. The movable switch member 396 is connected to one terminal of an electrical power source 402. The other terminals of the clutch 346, the clutch 382, the motor 392, and the power source 402 are connected together by respective ground connections, for example.

The output of the radio receiver 300 is impressed upon the amplitude modulator 14. A changeover switch 404 is provided to connect either of the resolvers 16a or 16b between the amplitude modulator 14 and the carrier reinserters 23 and 24. As indicated, the switches 404 and 394 may be ganged together. The switches 404 and 394 have intermediate positions in which the resolver 16a is connected into the system, but in which neither of the motors 384 and 392 is energized.

The arrangement of the carrier source 10, the carrier reinserters 23 and 24, the demodulators 26 and 28, the deflection amplifiers 30 and 32, and the oscillograph tube 40 may be the same as in the system of Figs. 1 and 3.

In the operation of the system of Fig. 10, the switches 396 and 404 may first be set in their panoramic receiving positions in which the resolver 16a is connected in the circuit and the motor 384 and the clutches 346 and 382 are energized. The motor 384 drives the resolver 16a and the tuning means 302 through the clutch 382, but the pointer 334 remains stationary because the positioning clutch 346 is disengaged. The loop 304 remains stationary since the motor 392 is not energized. The resolver 16b is disconnected during panoramic receiving.

During panoramic receiving, the arrangement of Fig. 10 operates in much the same manner as the panoramic receiver of Fig. 4. As indicated in connection with Figs. 7 to 9, a pattern having radial spikes is produced by the oscillograph 40. The pointer 334 is rotated by means of the handle 340 until the pointer is lined up with one of the spikes.

The switches 394 and 404 may then be shifted into their direction finding positions in order to engage the positioning clutch 346, disengage the magnetic clutch 382, stop the motor 384, and energize the motor 392. As described in connection with Figs. 7 to 9, the positioning clutch 346 rotates the tuning means 302 until the receiver 300 is tuned to the frequency corresponding to the position of the pointer 334. This operation tunes in the station which produces the spike with which the pointer 334 was aligned.

The motor 392 drives the resolver 16b and the loop antenna 304. It may be advantageous to rotate the loop 304 at a higher speed than the speed of rotation of the tuning means 302. During direction finding, the arrangement of Fig. 10 operates in much the same manner as the direction finding receiver of Fig. 3.

By means of the system of Fig. 10, both the frequency and the direction of an intercepted station may be determined readily. The loop antenna 304, the resolver 16b and the motor 392 may be located at a great distance from the remainder of the components of the system. No extended mechanical linkage is required. The lengths of the cables connecting the loop 304 with the receiver 300, and the resolver 16b with the changeover switch 404, are not critical since no complicated phasing problems are involved. Moreover, any phasing errors may be corrected by means of an arrangement such as that shown in Figs. 5 and 6. The speeds of the motors 384 and 392 are not critical since the output voltages provided by the resolvers 16a and 16b do not vary with the speed of the resolvers. As previously indicated, the resolvers 16a and 16b give positional indications even when they are stationary.

The arrangement including the pointer 334 and the handle 340 provides a manual tuning dial for the system of Fig. 10. When the switches 394 and 404 are in their intermediate positions, the system is adjusted for manual tuning. The motors 384 and 392 are disconnected and the magnetic clutch 382 is disengaged. However, the positioning clutch 346 is engaged so that the tuning means may be adjusted by shifting the position of the pointer 334. During manual tuning, the resolver 16a is connected in the system so that the electron beam of the cathode ray oscillograph 40 is displaced radially when a station is tuned in manually.

During direction finding, the tuning means may also be adjusted manually by shifting the position of the pointer 334. Thus, the frequencies of several stations may be recorded during panoramic receiving, and then the system may be tuned manually during direction finding to determine the direction of each of the stations.

In the direction finding system of Fig. 3 the loop 82, the motor 22, and the resolver 16 may be located a great distance from the other components of the system. Alternatively, the carrier source 10, the modulator 14, the carrier reinserters 23 and 24, and the demodulators 26 and 28 may also be located remotely from the other components, along with the loop, the motor and the resolver. The lengths of the cables interconnecting the various components are not critical. The speed of the motor 22 may vary widely without affecting the accuracy of the directional indications or the size of the pattern produced by the oscillograph 40.

Many of the details of the embodiments described above are merely illustrative and should not be taken as limitative. The invention may be practiced in many equivalent forms. The scope of the invention is indicated by the following claims:

I claim:

1. An apparatus to provide continuous polar plots of a dependent variable as a function of an independent variable, comprising driving means for cyclically varying the independent variable, means to produce electrical information signals corresponding to variations of the dependent variable, a source of a carrier wave, a modulator to combine the carrier wave and the information signals to provide a high frequency output wave modulated in accordance with the information signals, a resolver including first and second relatively rotatable means, one of the means being rotatively connected with the driving means and the other having a stationary mounting, a primary coil on the first means connected to the output of the modulator, first and second secondary coils carried at right angles on the second means, the primary and the secondaries being inductively coupled, first and second carrier reinserters to mix carrier components from the carrier source with the outputs of the first and second secondaries to produce outputs which are amplitude modulated in quadrature in accordance with the cyclical variation of the independent variable, first and second demodulators receiving the outputs of the carrier reinserters and providing demodulated outputs, and an oscillograph having horizontal deflecting means connected to the output of the first demodulator and vertical deflecting means connected to the output of the second demodulator.

2. An oscillographic direction finding apparatus, comprising a radio receiver having a rotatable loop antenna, driving means for rotating the antenna, a source of a carrier wave, a modulator to combine the carrier wave and the output of the receiver to provide a high frequency wave modulated in accordance with the receiver output, a resolver including first and second relatively rotatable means, one of the means being rotatively connected with the driving means and the other having a stationary mounting, a primary coil on the first means connected to the output of the modulator, first and second secondary coils carried at right angles on the second means, the primary and the secondaries being inductively coupled, first and second carrier reinserters to mix carrier components from the carrier source with the outputs of the first and second secondaries to produce outputs which are amplitude modulated in quadrature in accordance with the rotational position of the loop, first and second demodulators receiving the outputs of the carrier reinserters and providing demodulated outputs, and an oscillograph having horizontal deflecting means connected to the output of the first demodulator and vertical deflecting means connected to the output of the second demodulator.

3. An oscillographic panoramic radio receiving system, comprising a radio receiver having cyclically variable tuning means, driving means for varying the tuning means, a source of a carrier wave, a modulator to combine the carrier wave and the output of the receiver to provide a high frequency output wave modulated in accordance with the receiver output, a resolver including first and second relatively rotatable means, one of the means being rotatively connected with the driving means and the other having a stationary mounting, a primary coil on the first means connected to the output of the modulator, first and second secondary coils carried at right angles on the second means, the primary and the secondaries being inductively coupled, first and second carrier reinserters to mix carrier components from the carrier source with the outputs of the first and second secondaries to produce outputs which are amplitude modulated in quadrature in accordance with the cyclical variation of the tuning means, first and second demodulators receiving the outputs of the carrier reinserters and providing demodulated outputs, and an oscillograph having horizontal deflecting means connected to the output of the first demodulator and vertical deflecting means connected to the output of the second demodulator.

4. In an apparatus to provide instantaneous oscillographic indications of rotational position, first and second relatively rotatable means, a primary coil carried by the first means, a source of a carrier wave having its output connected to the primary coil, first and second secondary coils coupled to the primary coil and carried by the second means approximately at right angles to each other, first and second carrier reinserters having inputs connected to the first and second secondary coils and other inputs connected to the carrier source to provide respective outputs which are amplitude modulated in quadrature in accordance with relative rotation of the first and second rotatable means, an oscillograph having horizontal and vertical deflecting means, and first and second demodulators supplied from the outputs of the respective first and second carrier reinserters to supply signals in quadrature to the horizontal and vertical deflecting means for producing indications on the oscillograph in accordance with relative rotation of the first and second rotatable means.

5. In an apparatus to produce a circular oscillographic pattern, first and second sources providing first and second signals approximately in quadrature, an oscillograph having horizontal and vertical deflecting means, means supplying a major portion of the first signal to the horizontal deflecting means, means supplying a major portion of the second signal to the vertical deflecting means, means supplying a minor portion of the first signal to the vertical deflecting means, and means supplying a minor portion of the second signal to the horizontal deflecting means.

6. In an apparatus for producing a circular oscillographic trace, first and second sources providing first and second signals approximately in quadrature, an oscillograph having first and second deflecting means, one of the deflecting means being horizontal and the other being vertical deflecting means, means supplying the first signal to the first deflecting means, means supplying the second signal to the second deflecting means, and means additionally supplying a portion of the first signal to the second deflecting means to compensate for any errors in the perpendicularity of the deflecting means and in the phase perpendicularity of the signals.

7. In an apparatus to provide instantaneous oscillographic indications of rotational position, rotatable generating means to provide first and second output signals approximately in quadrature in synchronization with rotation of the generating means, an oscillograph having first and second deflecting means, one of the deflecting means producing approximately horizontal deflection and the other producing approximately vertical deflection, means to supply the first signal to the first deflecting means, means to supply the second signal to the second deflecting means, and means additionally to supply a portion of the first signal to the second deflecting means, to compensate for any error in the perpendicularity of the deflecting means or in the phase perpendicularity of the signals.

8. An apparatus to provide continuous oscillographic polar plots of a dependent variable as a function of an independent variable, comprising driving means for cyclically varying the independent variable, means to produce electrical information signals corresponding to variations of the dependent variable, a source of a carrier wave, a modulator to combine the carrier wave and the information signals to provide a high frequency output wave modulated in accordance with the information signals, a resolver including first and second relatively rotatable means, one of the means being rotatively connected with the driving means and the other having a stationary mounting, a primary coil on the first means connected to the output of the modulator, first and second secondary coils coupled to the primary coil and carried approximately at right angles on the second means, first and second carrier reinserters to mix carrier components from the carrier source with the outputs of the first and second secondaries to produce outputs which are amplitude modulated approximately in quadrature in accordance with the cyclical variation of the independent variable, first and second demodulators receiving the outputs of the carrier reinserters and providing demodulated outputs, an oscillograph having first and second deflecting means, one of the deflecting means providing approximately horizontal deflection and the other providing approximately vertical deflection, means supplying the output of the first demodulator to the first deflecting means, means supplying the output of the second demodulator to the second deflecting means, and means additionally supplying a portion of the output of the first demodulator to the second deflecting means to compensate for any error in the perpendicularity of the secondary coils or in the perpendicularity of the deflecting means.

9. A receiving system for providing oscillographic indications of the frequency and direction of a station, comprising a radio receiver having rotatable tuning means and a rotatable loop antenna, respective means to rotate the tuning means and the loop antenna, a source of a carrier wave, a modulator to amplitude modulate the carrier wave in accordance with the output of the receiver, means including a rotary resolver to utilize the output of the modulator for providing first and second signals amplitude modulated in quadrature to correspond with rotation of the resolver, means to rotate the resolver in accordance with rotation of one of the loop antennas or the tuning means, first and second demodulators to demodulate the first and second signals, an oscillograph having horizontal deflecting means connected to the output of the first demodulator and vertical deflecting means connected to the output of the second modulator, a pointer adjacent the oscillograph movable into alignment with an oscillographic indication of the frequency of a station when the tuning means is being rotated, and means forming a positioning connection between the pointer and the tuning means operative to position the tuning means at the frequency setting to which the pointer is adjusted when the loop antenna is being rotated.

10. A receiving system for providing oscillographic indications of the frequency and direction of a station, comprising a radio receiver having rotatable tuning means and a rotatable loop antenna, a motor, first and second clutches forming disengageable driving connections from the motor to the tuning means and the loop antenna respectively, operating means to engage the clutches alternatively, a source of a carrier wave, a modulator to combine the carrier wave and the output of the receiver to provide a high frequency output wave modulated in accordance with the output of the receiver, a resolver including first and second relatively rotatable means, one of the means being driven by the motor and the other having a stationary mounting, a primary coil on the first means connected to the output of the modulator, first and second secondary coils coupled to the primary coil and carried at right angles to each other on the second means, first and second carrier reinserters to mix carrier components from the carrier source with the outputs of the first and second secondary coils to produce outputs which are amplitude modulated in quadrature in accordance with rotation of the motor, first and second demodulators receiving the outputs of the carrier reinserters and providing demodulated outputs, an oscillograph having horizontal deflecting means connected to the output of the first demodulator and vertical deflecting means connected to the output of the second demodulator, a pointer adjacent the oscillograph movable into alignment with an oscillographic indication of the frequency of a station when the tuning means is being driven through the first clutch, and means forming a positioning connection between the pointer and the tuning means operative to position the tuning means at the frequency setting to which the pointer is adjusted when the loop antenna is being driven through the second clutch.

11. A receiving system for providing oscillographic indications of the frequency and direction of a station, comprising a radio receiver having rotatable tuning means and a rotatable loop antenna, respective means to rotate the tuning means and the loop antenna, a source of a carrier wave, a modulator to amplitude modulate the carrier wave in accordance with the output of the receiver, means including a rotary resolver to utilize the output of the modulator for providing first and second signals amplitude modulated in quadrature to correspond with rotation of the resolver, selectively operable means to rotate the resolver in synchronization with the tuning means or the loop antenna, first and second demodulators to demodulate the first and second signals, and an oscillograph having horizontal deflecting means connected to the output of the first demodulator and vertical deflecting means connected to the output of the second demodulator.

12. A receiving system for providing oscillographic indications of the frequency and direction of a station, comprising a radio receiver having rotatable tuning means and a rotatable loop antenna, respective means to rotate the tuning means and the loop antenna, a source of a carrier wave, a modulator to combine the carrier wave and the output of the receiver to provide a high frequency output wave modulated in accordance with the output of the receiver, a resolver including first and second relatively rotatable means, means to produce relative rotation of the first and second means in accordance with rotation of one of the tuning means or the loop antenna, a primary coil on the first means connected to the output of the modulator, first and second secondary coils coupled to the primary coil and carried at right angles to each other on the second means, first and second carrier reinserters to mix carrier components from the carrier source with the outputs of the first and second secondaries to produce outputs which are amplitude modulated in quadrature in accordance with relative rotation of the first and second means, first and second demodulators receiving the outputs of the carrier reinserters and providing demodulated outputs, and an oscillograph having horizontal deflecting means connected to the output of the first demodulator and vertical deflecting means connected to the output of the second demodulator.

13. A receiving system for providing oscillographic indications of the frequency and direction of a station, comprising a radio receiver having rotatable tuning means and a rotatable loop antenna, respective motors to drive the tuning means and the loop antenna, operating means to energize the motors alternatively, a source of a carrier wave, a modulator to amplitude modulate the carrier wave in accordance with the output of the receiver, means including a pair of resolvers driven by the tuning means and the loop antenna respectively to utilize the output of the modulator for providing first and second signals amplitude modulated in quadrature to correspond with rotation of the tuning means or the loop antenna, first and second demodulators to demodulate the first and second signals, switching means alternatively to connect each of the resolvers for operation, and an oscillograph having horizontal deflecting means connected to the output of the first demodulator and vertical deflecting means connected to the output of the second demodulator.

14. A receiving system for providing oscillographic indications of the frequency and direction of a station, comprising a radio receiver having rotatable tuning means and a rotatable loop antenna, respective motors to drive the tuning means and the loop antenna, means to energize the motors alternatively, a source of a carrier wave, a modulator to combine the carrier wave and the output of the receiver to provide a high frequency output wave modulated in accordance with the output of the receiver, first and second resolvers, each including first and second relatively rotatable means, means to produce relative rotation of the first and second means of the first and second resolvers in accordance with rotation of the antenna and the tuning means respectively, a primary coil on each of the first means, first and second secondary coils coupled to the primary coil and carried at right angles to each other on each of the second means, first and second carrier reinserters to mix carrier components from the carrier source with the outputs of the first and second secondaries on one of the resolvers to produce outputs which are amplitude modulated in quadrature in accordance with rotation of the antenna or the tuning means, means alternatively to connect each of the resolvers between the modulator and the carrier reinserters, first and second demodulators receiving the outputs of the carrier reinserters and providing demodulated outputs, and an oscillograph having horizontal deflecting means connected to the output of the first demodulator and vertical deflecting means connected to the output of the second demodulator.

ROBERT W. LOCKHART.

References Cited in the file of this patent
UNITED STATES PATENTS

| Number | Name | Date |
|---|---|---|
| 1,994,232 | Schuck | Mar. 12, 1935 |
| 2,403,967 | Busignies | July 16, 1946 |
| 2,475,212 | Wolff | July 5, 1949 |
| 2,476,977 | Hansel | July 26, 1949 |
| 2,477,557 | Torsch | July 26, 1949 |
| 2,574,946 | White | Nov. 13, 1951 |